Patented May 16, 1933

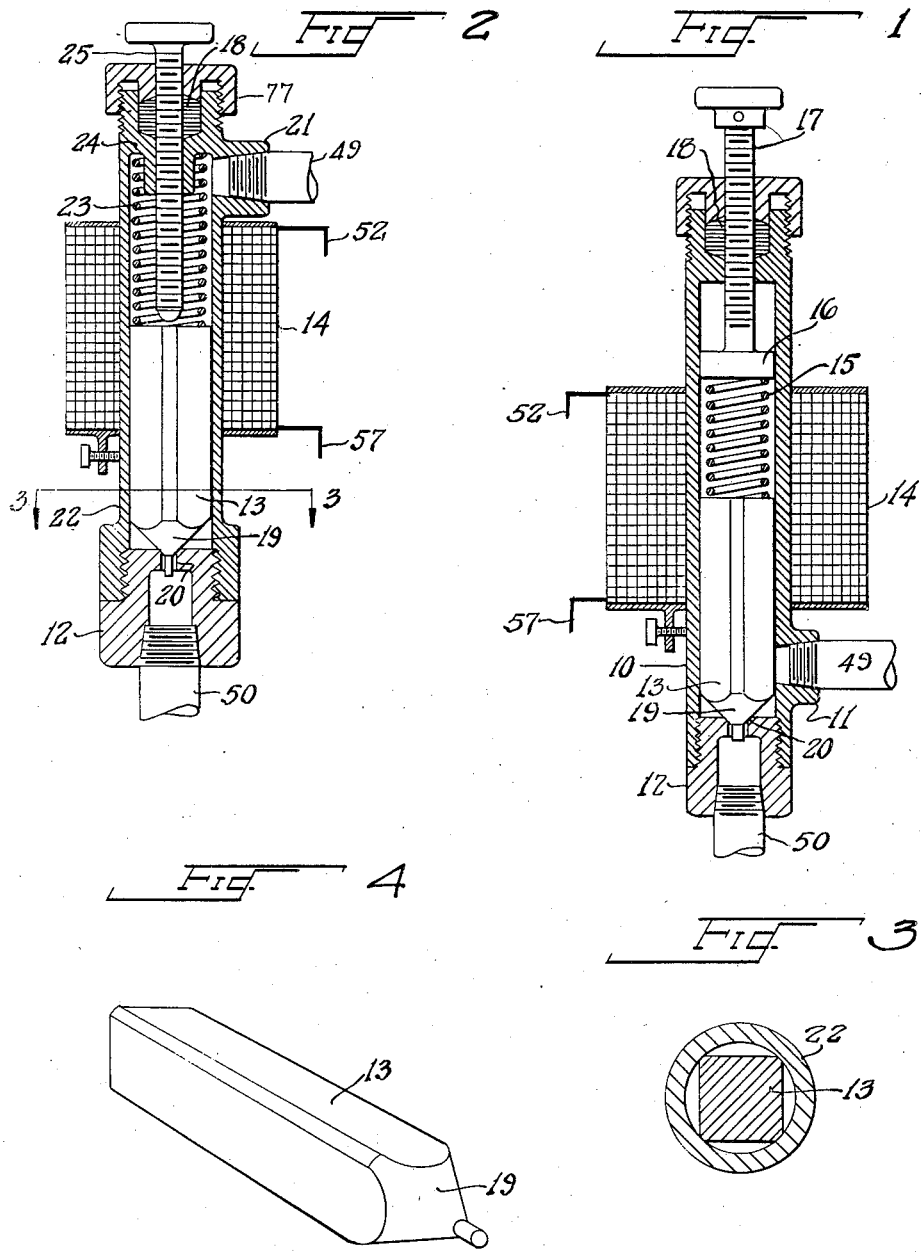

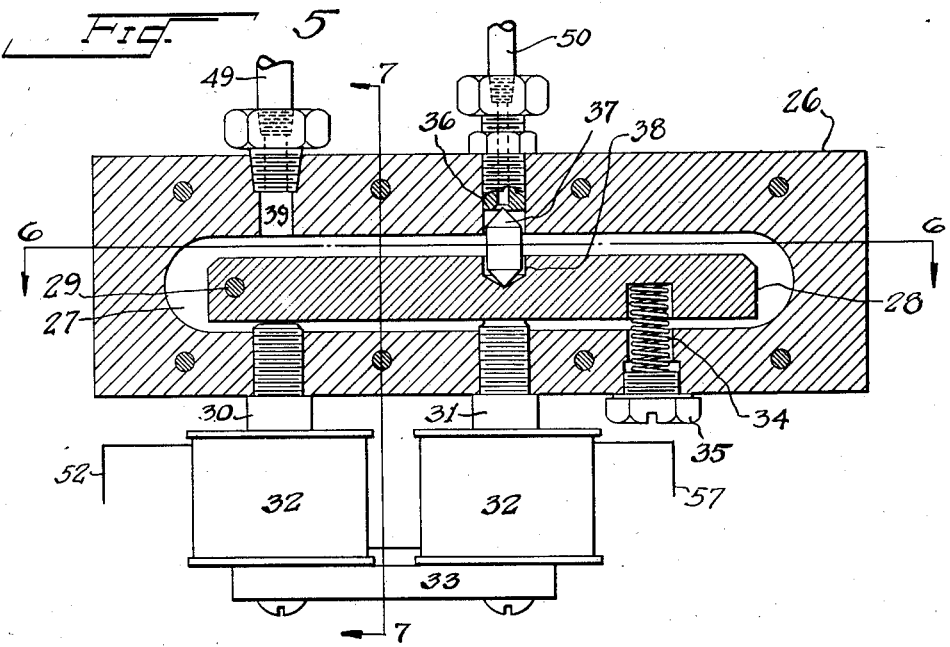
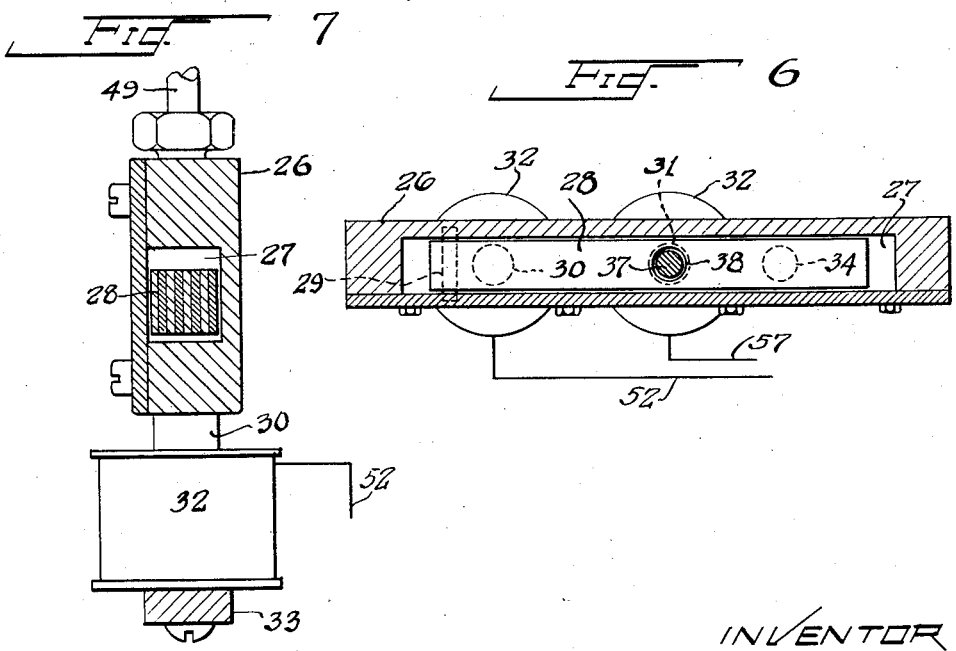

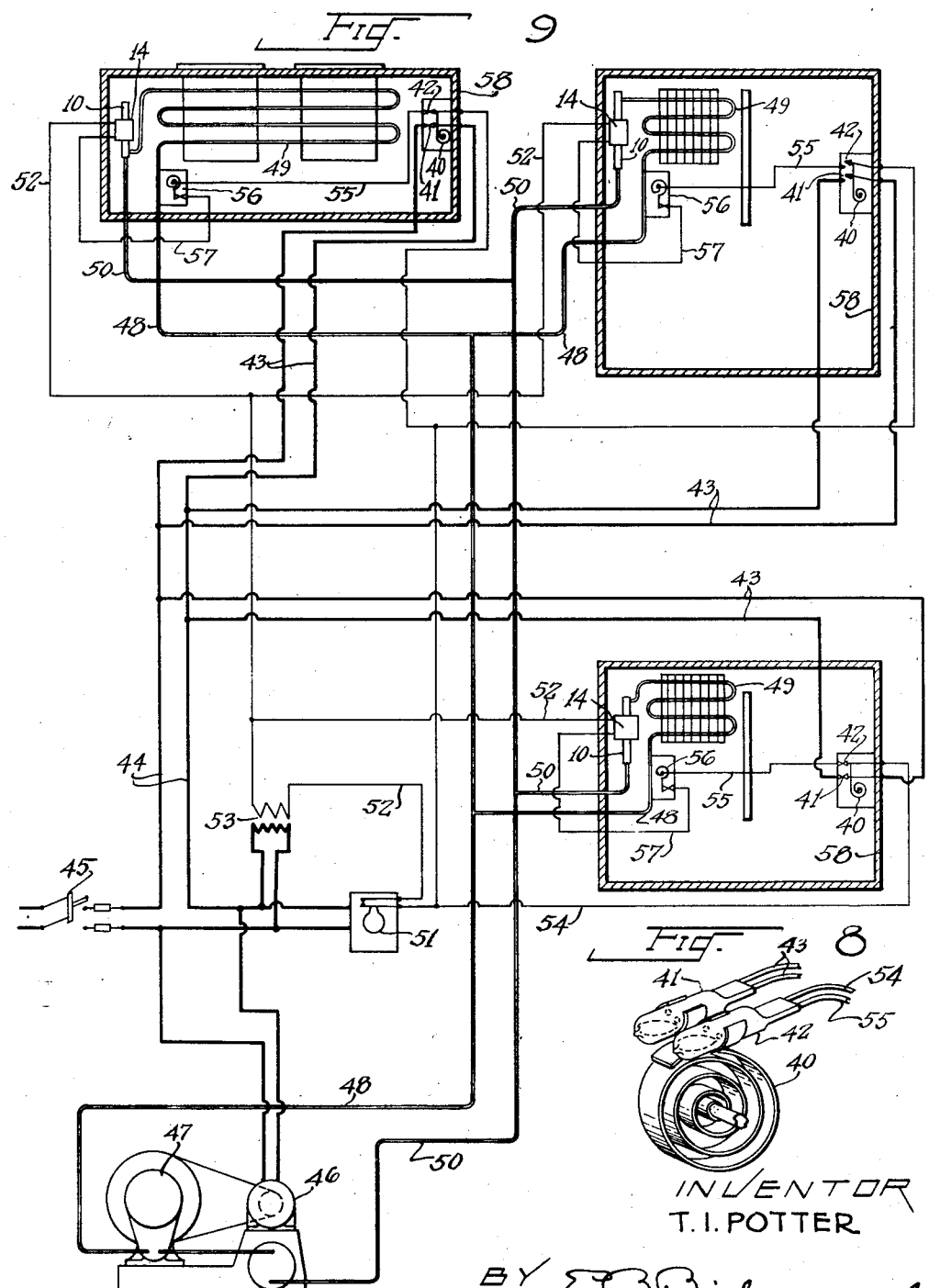

1,909,893

UNITED STATES PATENT OFFICE

THOMAS I. POTTER, OF PORTLAND, OREGON

ELECTRICALLY OPERATED EXPANSION VALVE AND CONTROL SYSTEM

Application filed January 26, 1931. Serial No. 511,269.

This invention relates generally to mechanical refrigeration, and particularly to an electrically operated expansion valve and control system therefor.

The main object of this invention is to provide an electrically operated expansion valve and control system for refrigerating units, with particular reference to those systems serving a plurality of zones where various temperatures are carried, or where the heat pumping requirements are variable and different.

The second object is to produce an electrically operated expansion valve especially adapted for use in the above mentioned control system.

The third object is to produce a control for a plurality of separated expansion lines in which the compressor unit will be operated when any box temperature falls below a predetermined minimum, but refrigerant will not be permitted to enter the expansion line of any box until its box temperature and frost line temperature are both above a predetermined maximum.

These, and other objects, will become more apparent from the specification following as illustrated in the accompanying drawings, in which:

Fig. 1 is a vertical section through the preferred form of expansion valve.

Fig. 2 is a similar view through a modified form of valve.

Fig. 3 is a transverse section taken along the line 3—3 in Fig. 2.

Fig. 4 is a perspective view of the solenoid core.

Fig. 5 is a longitudinal section through still another form of expansion valve.

Fig. 6 is a section taken along the line 6—6 in Fig. 5.

Fig. 7 is a section taken along the line 7—7 in Fig. 5.

Fig. 8 is a perspective view of the thermostatically operated control switch.

Fig. 9 is a diagrammatic view showing the system as a whole.

Similar numbers of reference refer to similar parts throughout the several views.

Referring in detail to the drawings, in the form of the valve shown in Fig. 1 there is illustrated a tubular valve body 10 near whose lower end is formed an outlet 11 and at whose lower end is secured a plug 12 above which is placed a slidable core 13 which is responsive to the pull of a solenoid coil 14. Above the core 13 is placed a spring 15 whose tension may be varied by means of a plunger 16 provided with a threaded shank 17 which passes through a stuffing box 18. The lower end of the core 13 is provided with a pointed end 19 which normally seats in the opening 20 of the plug 12.

In the form of the device shown in Fig. 2 the outlet opening 21 is at the upper end of the valve body 22 and the upper end of the spring 23 reacts against the head 24, whereas the screw 25 merely serves as a stop which limits the amount the valve can open. The other parts are identical with those shown in Fig. 1. It will be noted that the core 13 is provided with flat sides to permit the flow of lubricant around same.

In Fig. 5 the body 26 is provided with a cavity 27 in which is pivotally mounted an armature 28 on a pin 29. In one side of the body 26 are mounted the cores 30 and 31 of an electromagnet across whose coils 32 is mounted the yoke 33. The armature 28 is urged away from the magnets by means of a spring 34 whose tension is regulated by means of a screw 35. The inlet valve 36 consists of a threaded sleeve which is screwed into the body 26. The valve plug 37 is pointed at each end, one end seating in the end of the inlet valve 36 and the other end occupying a recess 38. The body 26 is provided with an outlet opening 39 which communicates with the cavity 27.

The flow of refrigerant through any of the three forms of expansion valves shown in Figures 1 to 6 inclusive is the same, namely intermittent; that is, the number and character of impulses imposed on the coils 14 or 32 and the relation of these factors to the tension of the reacting springs.

Referring to Fig. 8 there is shown a thermostatically operated dual switch consisting of a spiral bi-metallic element 40 on which are mounted the mercury switches 41 and 42, the former carrying the high voltage current through the wires 43 to the power line 44, which is provided with the usual switch 45. The power line 44 extends to the motor 46 which operates the compressor 47 whose suction line 48 branches out to a plurality of expansion coils 49. The high pressure side 50 of the refrigerant line branches out to a number of electrically operated expansion valves 10 through which refrigerant can flow to their respective expansion coils 49. The power line 44 connects to a continuously operating motor-driven interrupter 51, one of whose leads 52 passes through a transformer 53 and branches to the various coils 14. The other lead 54 branches through all of the low voltage switches 42 from whence the wire 55 connects same to one side of a frost line thermostatic switch 56, whose lead 57 connects with its respective coil 14.

It will be understood from the foregoing that the temperature of any one of the cooling boxes 58 will affect the dual switches 41 and 42. An over-temperature at the element 40 will close the switch 41 which will cause the motor 46 to operate. At the same time the switch 42 is closed by the same action on the element 40, but if the frost line temperature is down the switch 56 is open and no current can flow to the electrically operated valve 10.

It follows that as soon as the heat from the box 58 has been absorbed by the coil 49 to an extent which permits its temperature to rise enough to close its switch 56 that the switches 42 and 56 become closed in series through the interrupter 51, which is continually operating causing an intermittent operation of the expansion valve 10 until either the box temperature or the frost line temperature falls below a predetermined minimum. If the box temperature falls below a predetermined minimum first it will stop the action of the electrically operated valve, but it will not stop the operation of the motor 46 if any of the other box temperatures is above the predetermined maximum.

In other words, there is provided a refrigerating system in which any number of evaporators may be served from a single pumping unit and the pumping unit will be operated as long as the box temperature of any one or more of the evaporators is above the predetermined maximum temperature and refrigerant will not be permitted to flow to any one evaporator as long as its frost line temperature or box temperature is below the predetermined maximum.

While I have illustrated several types of intermittently operated electrically driven expansion valves, it must be understood that any electrically operated expansion valve which functions suitably can be employed whether or not such operation be intermittent.

I claim:

1. A refrigerating system having in combination a heat pumping unit and a plurality of evaporator units, an electrically operated expansion valve at each of said evaporator units, a frost line temperature switch at each of said evaporator units, and a dual box temperature switch associated with each of said evaporator units, one side of said dual switch passing in series through said frost line switch to its respective expansion valve and the other side of said dual switch controlling the operation of the pumping unit.

2. In a control for refrigerating systems, the combination of a box temperature-actuated motor-controlling switch, an electrically operated expansion valve for controlling the flow of refrigerant to an individual unit, and a pair of temperature-actuated switches connected in series with said electrically operated valve in a manner to close the circuit through same when the frost line temperature and box temperature are both above a predetermined maximum and to stop the operation of said electrically operated valve when either said frost line temperature or box temperature are below a predetermined maximum.

3. In a refrigerating system, the combination of a motor driven compressor, a box temperature switch whose over-temperatures close a circuit through said motor, an intermittently operated electrically controlled expansion line connected with said compressor, and a frost line switch operating in series with said box temperature switch to control said expansion line including an interrupter in the circuit of said frost line switch.

4. In a refrigerating system, the combination of a single pumping unit with a plurality of evaporator boxes thermally separated from each other, each of said boxes having an independent expansion coil connected to said pumping unit, each of said coils having an electrically operated expansion valve for controlling the flow of refrigerant therethrough, an interrupter for the flow of current to said valves, a pair of temperature actuated switches in each of said boxes one of which is closed to the expansion line and the other somewhat removed therefrom, both of said switches having series connections with said electrically operated expansion valve and its interrupter, and a motor controlling switch in each box remote from said coil adapted to independently operate said pumping unit when the temperature of its respective box rises above a predetermined maximum.

THOMAS I. POTTER.